United States Patent Office 2,806,831
Patented Sept. 17, 1957

2,806,831

SOLUTION OF POLYACRYLONITRILE COLOR STABILIZED WITH TRIS(CHLOROETHYL) PHOSPHITE

Arthur B. Beindorff, Decatur, Ala., assignor to The Chemstrand Corporation, Decatur, Ala., a corporation of Delaware No Drawing. Application May 3, 1954,
Serial No. 427,347

5 Claims. (Cl. 260—32.6)

This invention relates to solutions of acrylonitrile polymers, and more particularly it relates to the preparation of solutions of acrylonitrile polymers which have an improved resistance to the formation of color upon heating.

In the production of shaped articles such as fibers, filaments, etc. from polymers of acrylonitrile, it is usually necessary to dissolve the polymers in a suitable organic solvent by means of heat, and to maintain such solutions at elevated temperatures for prolonged periods of time during the spinning operation such as, for example, extruding such heated solutions into either heated air or hot liquid coagulating baths. During these and other operations involving the heating of acrylonitrile solutions, the color of the spinning solutions undergoes a progressive darkening which affects the color of the articles produced. While the exact phenomenon which causes this undesirable color formation has not been determined with certainty, it has been observed that the color is most noticeable and objectionable when solvents are employed which contain a

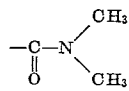

group. A particularly useful solvent of the type referred to is N,N-dimethylacetamide. It has been suggested that this solvent, as obtained from commercial sources, contains certain organic amines which appear to react with the polymer, particularly at elevated temperatures, to form products which impart undesirable color to the polymer solutions. Another possible explanation is that the presence of oxygen is responsible for the color formation. This theory is supported by the fact that the initial occurrence of color can be somewhat retarded by slurrying the polymer in an oxygen-free atmosphere. Whatever the correct explanation for this undesirable color formation may be, no satisfactory solution has yet been proposed. Lustrous fibers have not heretofore been obtainable from solutions of polymers of acrylonitrile, nor have the solutions of the polymers been colorless, clear and gel-free to the degree necessary for suitable commercial products.

It is, therefore, an object of the present invention to substantially minimize the formation of undesirable color in polymer compositions. Another object is to provide a process for obtaining such solutions. A still further object relates to color diminution in polymer compositions which develop color with the passage of time, particularly when solutions of the polymers are permitted to stand for a prolonged period of time or at elevated temperatures. Still another object is to provide solutions of acrylonitrile polymers and articles produced therefrom having improved color characteristics. Other objects will be apparent from the following description of the invention.

The objects of this invention are accomplished by dissolving acrylonitrile polymers in N,N-dimethylacetamide, in the presence of tris(chloroethyl)phosphite. This inhibiting agent permits prolonged standing of the solution or exposure to high temperatures for considerable periods of time without the development of a high degree of objectionable color incident to the dissolving of said polymers in solvents such as N,N-dimethylacetamide.

The use of tris(chloroethyl)phosphite in accordance with this invention effects improvement in color characteristics in all solutions, and articles produced therefrom, of acrylonitrile polymers including not only polyacrylonitrile, but also acrylonitrile copolymers and interpolymers, particularly those containing at least 80% by weight of acrylonitrile in the polymer molecule, as well as in blends of such acrylonitrile fiber-forming polymers with readily dyeable basic copolymers such as copolymers containing at least 30% of a vinylpyridine and up to 70% of another monomer polymerizable therewith.

The preferred method of practicing this invention involves the addition of tris(chloroethyl)phosphite to the polymer solvent prior to adding the polymer since in this manner any color that might be developed, as by heating, will be removed at the moment of its formation. However, the inhibiting compound may be added during or after the dissolution of the polymer in the solvent. It is preferred that the tris(chloroethyl)phosphite be present in a small amount compared with the amount of polymer dissolved. Thus, although the amount is not critical, it is preferred that the tris(chloroethyl)-phosphite be present in the amount of about 0.1 to 1.0 percent based on the total weight of the polymer solution.

By the practice of this invention it is possible to prepare solutions of acrylonitrile polymers in conventional solvents, which solutions are nearly colorless. The improvement in solution color leads to greatly improved yarn color. The yarn in turn can be dyed to brighter shades and is much more suitable for use in the textile field.

The invention is further illustrated by reference to the following specific example.

Example

Five parts of a blend of a polymer containing 97% acrylonitrile and 3% vinylacetate with a second polymer containing 50% 2-methyl-5-vinylpyridine and 50% acrylonitrile was added to 95 parts by weight of N,N-dimethylacetamide containing 0.15% tris(chloroethyl)-phosphite. Solution was effected by heating to 80° C. A control solution was prepared in exactly the same manner and of the same composition except that the tris(chloroethyl)phosphite was omitted. The solutions were heated to 80° C. for four hours and the color formation in each solution determined by measurement of light transmission in a Cenco "Photelometer." Approximately twice as much light was transmitted through the solution containing the tris(chloroethyl)phosphite, indicating a much lower degree of color formation in the solution containing the additive.

Similar results are obtained when tris(chloroethyl)-phosphite is added to N,N-dimethylacetamide solutions of other acrylonitrile polymers containing at least 80% of acrylonitrile and up to 20% of monomers polymerizable therewith.

It has been demonstrated that tris(chloroethyl)phosphite does not inhibit color formation simply by removing oxygen. This was accomplished by the preparation of a series of six polymer solutions in the absence of air. Upon heating the sealed solutions for from 120 to 240 minutes at 80° C., it was observed that the two solutions containing no tris(chloroethyl)phosphite discolored considerably more than did the other solutions containing from 0.1 to 1.0 percent of tris(chloroethyl)-phosphite.

I claim:

1. As a new composition of matter, a stabilized solution of an acrylonitrile polymer in N,N-dimethylacetamide, said solution containing, as a color stabilizer, tris(chloroethyl)phosphite.

2. A solution of an acrylonitrile polymer in N,N-dimethylacetamide stabilized against color formation by the presence of at least 0.1 percent of tris(chloroethyl)-phosphite based on the total weight of said solution.

3. As a new composition of matter, a stabilized solution of a polymer of acrylonitrile, containing in the polymer molecule at least 80 percent by weight of acrylonitrile, in N,N-dimethylacetamide, said solution containing, as a color stabilizer, tris(chloroethyl)phosphite.

4. As a new composition of matter, a stabilized solution of a polymer of acrylonitrile, containing in the polymer molecule at least 80 percent by weight of acrylonitrile, in N,N-dimethylacetamide, said solution containing, as a color stabilizer, at least 0.1 percent of tris(chloroethyl)phosphite, based on the total weight of said solution.

5. As a new composition of matter, a stabilized solution of a polymer of acrylonitrile, containing in the polymer molecule at least 80 percent by weight of acrylonitrile, in N,N-dimethylacetamide, said solution containing from 0.1 to 1.0 percent of tris(chloroethyl)phosphite based on the total weight of said solution.

References Cited in the file of this patent

UNITED STATES PATENTS 2,656,329    Ham _____ Oct. 20, 1953